United States Patent [19]

Miller

[11] Patent Number: 4,947,951
[45] Date of Patent: Aug. 14, 1990

[54] PRESSURE RESPONSIVE AND ELECTRICALLY CONTROLLABLE FLOW CONTROL APPARATUS

[75] Inventor: Laurence L. Miller, West Lafayette, Ind.

[73] Assignee: TRW Inc., Lyndhurst, Ohio

[21] Appl. No.: 226,723

[22] Filed: Aug. 1, 1988

[51] Int. Cl.⁵ .............................................. B62D 5/08
[52] U.S. Cl. ........................................ 180/143; 91/433; 91/452; 417/300
[58] Field of Search ................. 180/143, 141, 142; 91/433, 451, 452; 417/300, 302

[56] References Cited

U.S. PATENT DOCUMENTS

| | | | |
|---|---|---|---|
| 3,384,020 | 5/1968 | Searle | 417/300 |
| 4,320,812 | 3/1982 | Takaoka et al. | 180/143 |
| 4,513,835 | 4/1985 | Fukino et al. | 180/142 |
| 4,691,797 | 9/1987 | Miller | 180/143 |
| 4,702,335 | 10/1987 | Cage et al. | 180/142 |
| 4,768,605 | 9/1988 | Miller et al. | 180/143 |

Primary Examiner—Mitchell J. Hill
Attorney, Agent, or Firm—Tarolli, Sundheim & Covell

[57] ABSTRACT

A power steering system includes a bypass valve for bypassing fluid from a main fluid conduit connected between an engine-driven, power steering pump and an actuatable, open-center, steering control valve which is actuated upon turning of a vehicle steering wheel. When the steering control valve is actuated, the demand for fluid through the steering control valve to a power steering motor increases. The fluid pressure in the main conduit varies as a function of the demand for fluid to the steering control valve. The bypass valve is urged toward an open condition by a fluid pressure signal. The bypass valve is urged toward a closed condition by a spring and by a fluid pressure which varies as a function of the demand for fluid to the steering control valve and as a function of an electrical signal which varies as a function of at least one vehicle operating parameter, such as vehicle speed. The fluid pressure which urges the bypass valve toward a closed condition is controlled by (i) a pressure responsive pilot valve assembly which is responsive to the fluid pressure in the main conduit and (ii) a solenoid operated pilot valve assembly which is responsive to the electrical signal which varies as a function of vehicle speed.

13 Claims, 2 Drawing Sheets

PRESSURE RESPONSIVE AND ELECTRICALLY CONTROLLABLE FLOW CONTROL APPARATUS

Technical Field

The present invention relates to a vehicle power steering system, and particularly relates to a fluid power steering system having a fluid flow control which responds to steering load and to at least one vehicle operating parameter.

Background

Fluid power steering systems for use in vehicles are well known. Typically, such a system includes an engine-driven, power steering pump for supplying fluid from a fluid reservoir through an actuatable power steering control valve to a power steering motor. The steering control valve is actuated in response to turning of a vehicle steering wheel. The steering motor provides assist in moving the vehicle wheels in response to actuation of the steering control valve. The pump is driven by the vehicle engine. As the vehicle engine speed increases, the pump speed increases. A bypass flow control valve directs excess fluid flow from the pump to the fluid reservoir.

A known hydraulic power steering system having a bypass valve is disclosed in U.S. Pat. No. 4,691,797. The power steering system of U.S. Pat. No. 4,691,797 includes an engine-driven, power steering pump for supplying fluid from a fluid reservoir through a flow control orifice in a main fluid conduit to an actuatable, open-center, power steering control valve. The bypass valve, when open, directs excess fluid from the pump to the fluid reservoir. A spring in a spring cavity acts on the bypass valve to urge the bypass valve to a closed condition. Fluid pressure in the spring cavity also acts on the bypass valve to urge the bypass valve to a closed condition.

In U.S. Pat. No. 4,691,797, a fluid pressure signal is created by a small pilot fluid flow from the pump through a variable orifice in a pilot fluid conduit. The fluid pressure signal is directed to the spring cavity of the bypass valve and acts to urge the bypass valve toward a closed condition. The variable orifice in the pilot fluid conduit is a solenoid operated valve. The solenoid operated valve controls fluid flow in the pilot fluid conduit in response to vehicle speed. Whether steering is occurring or not at low vehicle speeds, the solenoid operated valve is in a fully open condition. Thus, the bypass valve is urged toward a closed condition, and the amount of fluid flow to the steering control valve may be at a maximum. Thus, maximum power assist is available in a steering maneuver at low vehicle speeds.

In a non-steering condition during vehicle operation at low vehicle speeds, a substantial amount of fluid flow through the steering control valve is unnecessary. This fluid flow through the steering control valve results in horsepower consumption. Thus, horsepower is unnecessarily consumed in the power steering system of U.S. Pat. No. 4,691,797 because of the substantial fluid flow through the open-center, steering control valve in a nonsteering condition at low vehicle speeds.

Another known power steering system having a bypass valve is disclosed in U.S. Pat. No. 4,768,605. The power steering system of U.S. Pat. No. 4,768,605 includes an engine-driven, power steering pump for supplying fluid under pressure from a fluid reservoir through a flow control orifice in a main fluid conduit to a power steering control valve which is actuated upon turning of a vehicle steering wheel. When the steering control valve is actuated, demand for pressurized fluid flow through the power steering control valve to a power steering motor increases.

In the power steering system of U.S. Pat. No. 4,768,605, a fluid pressure signal is created by a small pilot fluid flow through a variable orifice in a pilot fluid conduit. A bypass valve is controlled in response to this fluid pressure signal. The variable orifice in the pilot fluid conduit is provided by a pressure responsive pilot valve assembly. The pressure responsive pilot valve assembly controls fluid flow in the pilot fluid conduit in response to the demand for fluid. The fluid pressure in the main fluid conduit increases as the demand for fluid increases. As the fluid pressure in the main fluid conduit increases, the pressure responsive pilot valve assembly opens and directs an increasing fluid pressure signal to urge the bypass valve toward a closed condition. The bypass valve is not controlled in response to any vehicle operating parameter such as vehicle speed, lateral acceleration, steering wheel position, steering wheel angular velocity, yaw position, or throttle position. However, in this system a relatively small amount of fluid flows through the steering control valve in a nonsteering condition at low vehicle speeds. Thus, horsepower consumption is relatively low.

SUMMARY OF THE INVENTION

The present invention is directed to a flow control apparatus for use in a vehicle power steering system. The flow control apparatus controls the amount of hydraulic fluid flow from an engine-driven, power steering pump through an actuatable, open-center, power steering control valve to a power steering motor in response to (i) a fluid pressure signal which varies as a function of demand for fluid flow through the steering control valve to the power steering motor and (ii) an electrical signal which varies as a function of at least one vehicle operating parameter, such as vehicle speed.

In a preferred embodiment of the present invention, a bypass valve bypasses fluid from the pump to a reservoir. Fluid pressure urges the bypass valve toward an open condition. A spring in a spring cavity acts on the bypass valve to urge the bypass valve toward a closed condition. Fluid pressure in the spring cavity also acts on the bypass valve to urge the bypass valve toward a closed condition. The fluid pressure in the spring cavity is controlled by (i) a pressure responsive pilot valve assembly which is responsive to the fluid pressure in the main conduit and (ii) a solenoid operated pilot valve assembly which is responsive to the electrical signal indicative of vehicle speed. The amount of fluid bypassed through the bypass valve varies as a function of the demand for fluid and as a function of vehicle speed. Thus, the amount of fluid flow to the steering control valve also varies as a function of the demand for fluid and as a function of vehicle speed.

The power steering system of the present invention (i) increases the fluid flow to the steering control valve when a steering load is applied, (ii) decreases fluid flow to the steering control valve as the vehicle speed increases, and (iii) minimizes the fluid flow to the steering control valve at low vehicle speeds in a nonsteering condition. By controlling the fluid flow to the steering control valve in response to the demand for fluid and in response to the vehicle speed, only a relatively small amount of fluid flow to the steering control valve is maintained in a nonsteering condition of the vehicle, even at low vehicle speeds. By minimizing fluid flow to the steering control valve at low vehicle speeds in a nonsteering condition, horsepower consumption is minimized and substantially reduced as compared to the power steering system of U.S. Pat. No. 4,691,797. Thus, the present invention is a load responsive, speed proportional power steering system with minimum horsepower consumption.

BRIEF DESCRIPTION OF THE DRAWINGS

The foregoing and other objects and features of the present invention will become more apparent to one skilled in the art to which the present invention pertains upon consideration of the following description with reference to the accompanying drawings, in which.

DESCRIPTION OF A PREFERRED EMBODIMENT

Figure 1:
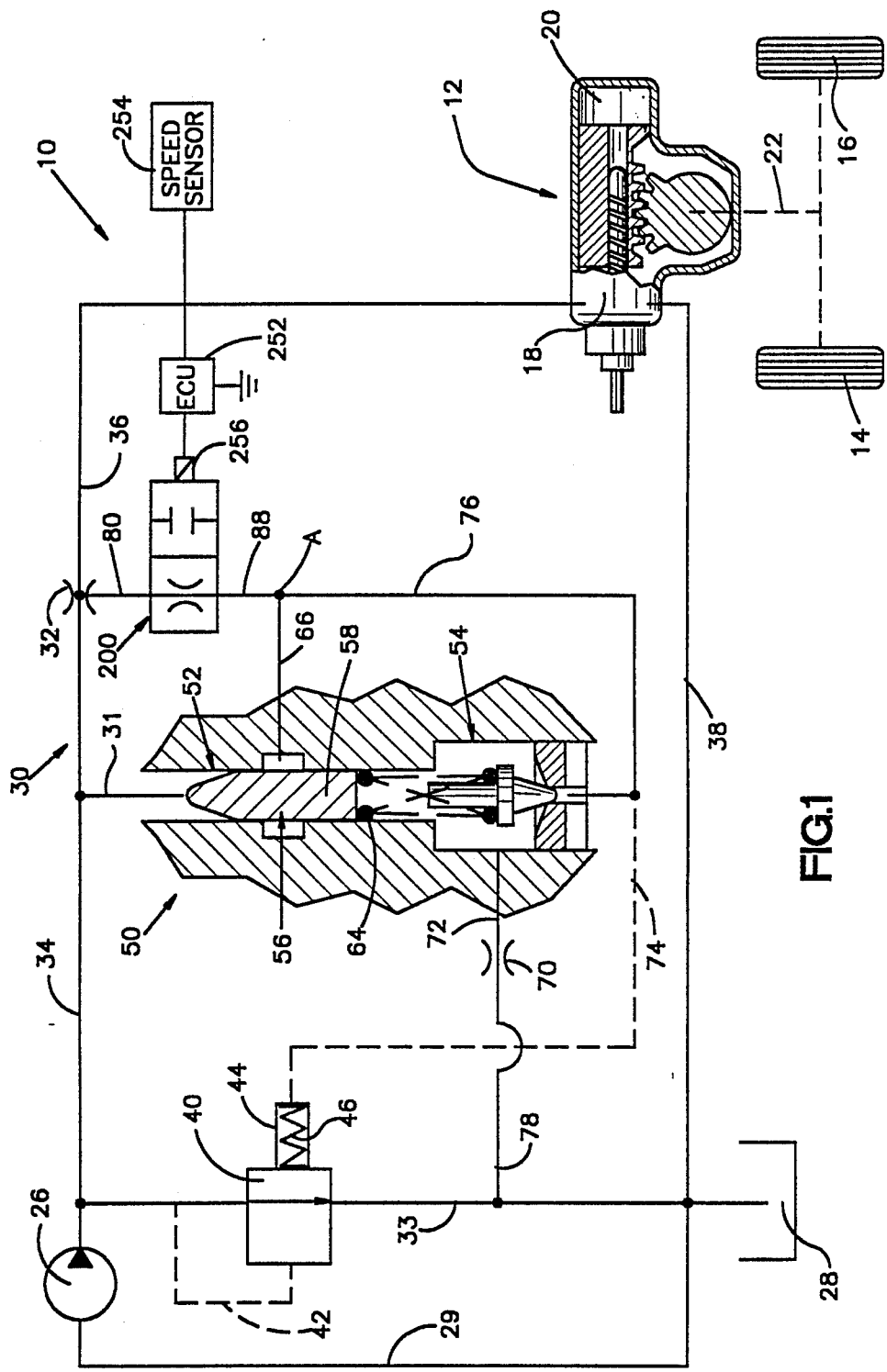
FIG. 1 is a schematic illustration of a power steering system constructed in accordance with the present invention.

A vehicle power steering system 10 for providing power assist to turn steerable wheels 14, 16 of a vehicle is illustrated in FIG. 1. The vehicle power steering system 10 includes a power steering mechanism 12 which is operable to turn the steerable wheels 14, 16 in response to a steering load applied to a vehicle steering wheel (not shown). The power steering mechanism 12 includes an open-center, power steering control valve 18 which is operable to supply fluid under pressure to a power steering motor 20 in response to turning the steering wheel. The power steering motor 20 is operatively connected with the steerable wheels 14, 16 by a vehicle steering linkage 22. The specific construction of the power steering mechanism 12 may vary. One power steering mechanism which can be used in the present invention is described in U.S. Pat. No. 3,606,819 issued Sept. 21, 1971 and entitled "Power Steering Gear Assembly." Other known power steering mechanisms could be used if desired.

An engine-driven, power steering pump 26 is connected in fluid communication through a fluid conduit 29 to a fluid reservoir 28. The pump 26 supplies fluid under pressure to the power steering mechanism 12. The pump 26 is driven by the vehicle engine (not shown), and discharges fluid to a first conduit section 34 of a main conduit 30. The conduit section 34 connects the pump 26 in fluid communication with a fixed orifice 32. The fixed orifice 32 is connected in fluid communication through a second conduit section 36 of the main fluid conduit 30 with an inlet port of the steering control valve 18. An outlet port of the steering control valve 18 is connected in fluid communication through a fluid conduit 38 with the fluid reservoir 28.

The conduit section 34 is also connected in fluid communication with the inlet port of a bypass valve 40. The outlet port of the bypass valve 40 is connected in fluid communication through a fluid conduit 33 with the fluid reservoir 28. The bypass valve 40 is urged toward an open condition by a pilot fluid pressure signal conducted from the conduit section 34 through a pilot conduit 42. A biasing spring 46 in a spring cavity 44 of the bypass valve 40 urges the bypass valve 40 toward a closed condition. Fluid pressure in the spring cavity 44 also urges the bypass valve 40 toward a closed condition.

Figure 2:
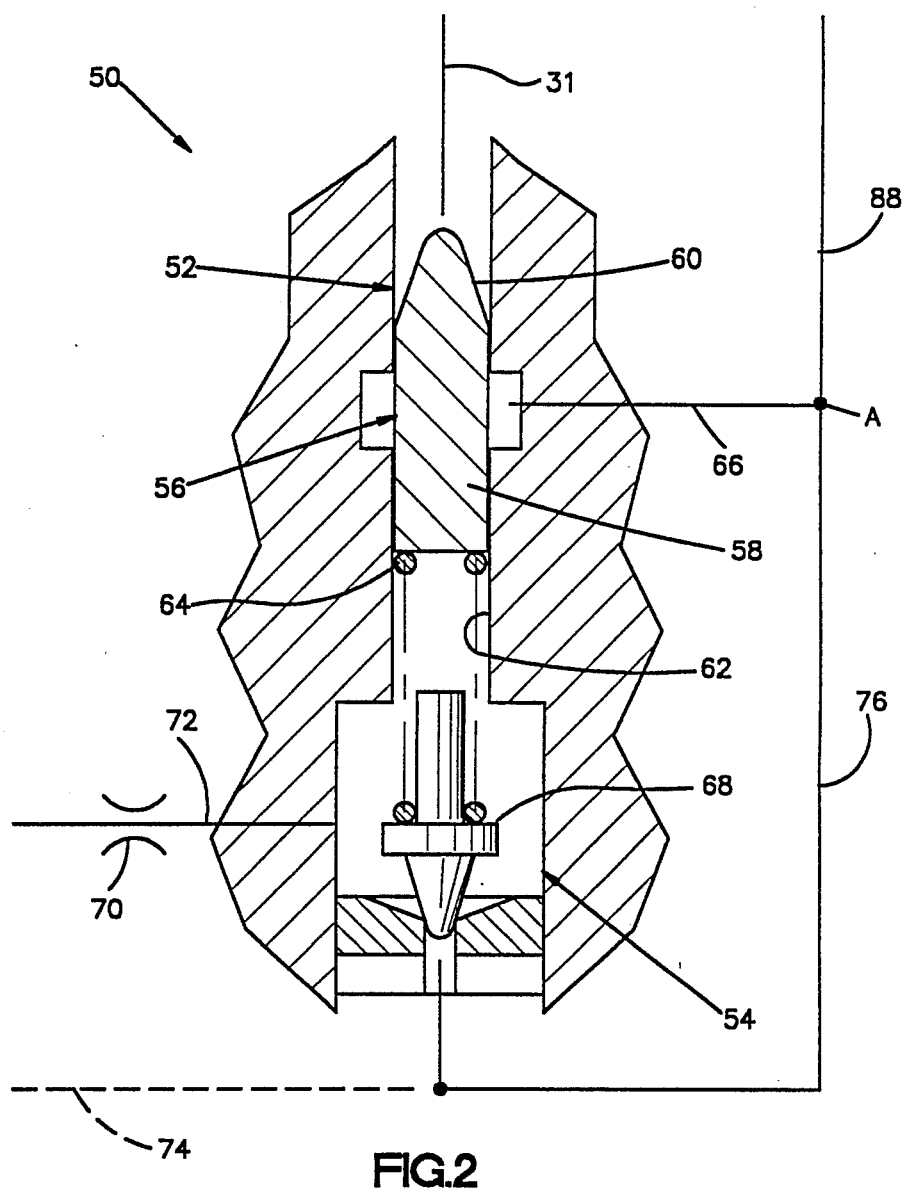
FIG. 2 is a schematic view of a portion of the system of FIG. 1.

Referring to FIGS. 1 and 2, the main conduit section 34 is also connected in fluid communication through a fluid conduit 31 with a pressure responsive pilot valve assembly 50. The pressure responsive pilot valve assembly 50 includes a pilot valve portion 52 and a relief valve portion 54. The pilot valve portion 52 includes an axially tapered pin 56 having a cylindrical body portion 58 and a conical nose end portion 60. The conical nose end portion 60 of the pin 56 is exposed to the fluid pressure in the fluid conduit 31. The other end of the pin 56 is disposed in a cylindrical spring chamber 62. The pin 56 is urged upward (as viewed in FIGS. 1 and 2) by a biasing spring 64 located in the spring chamber 62.

When the fluid pressure against the nose end portion 60 of the pin 56 is less than a first predetermined fluid pressure, the pin 56 is in its fully closed position illustrated in FIGS. 1 and 2. In the fully closed position, the cylindrical body portion 58 of the pin 56 blocks fluid communication between the fluid conduit 31 and a fluid conduit 66 connected in fluid communication with the outlet port of the pilot valve portion 52 of the valve assembly 50. The fluid conduit 66 is connected in fluid communication through a fluid conduit 76 to the inlet port of the relief valve portion 54 of the valve assembly 50. The bypass valve 40 is urged toward a closed condition by a pilot fluid pressure signal conducted from the fluid conduit 76 through a pilot conduit 74.

When the fluid pressure in the conduit section 34 increases, the fluid pressure in the fluid conduit 31 increases. The fluid pressure applied against the nose end portion 60 of the pin 56 thereby increases. This urges the pin 56 away from the illustrated fully closed position toward an open position. The amount by which the fluid pressure in the conduit section 34 exceeds the first predetermined fluid pressure determines the distance the pin 56 moves toward an open position. As the pin 56 moves away from the fully closed position toward an open position, the fluid pressure in the fluid conduit 66 and the fluid conduit 76 increases. This results in an increase in the pilot fluid pressure signal transmitted through the pilot conduit 74 to the spring cavity 44. The bypass valve 40 is thereby urged toward a closed condition when the fluid pressure in the conduit section 34 increases.

The pilot valve portion 52 when open, modulates the fluid pressure in the spring cavity 44 in response to fluid pressure variations in the conduit section 34 of the main conduit 30. The fluid pressure in the conduit section 34 varies as a function of the steering load, i.e., the fluid pressure in the power steering motor 20.

It may be desirable to vent the pressure in the fluid conduit 76 to prevent the occurrence of excessive fluid pressure in this conduit. This function is provided by the relief valve portion 54 of the valve assembly 50. The relief valve portion 54 includes a relief valve member 68 which is urged to its fully closed position by the spring 64. Thus, only one biasing spring is required to urge the pilot valve portion 52 and the relief valve portion 54 to their fully closed positions.

The outlet port of the relief valve portion 54 is connected in fluid communication through a fluid conduit 72 to a fixed orifice 70. The fixed orifice 70 is connected in fluid communication through a fluid conduit 78 to the fluid reservoir 28. An increase in fluid pressure in the fluid conduit 36 is transmitted through fluid conduits 80, 88 and 76 to the relief valve member 68. The relief valve member 68 is urged toward an open position by the increased fluid pressure in the fluid conduit 76. If the fluid pressure in the fluid conduit 76 exceeds a second predetermined fluid pressure, then the relief valve member 68 is moved to an open position. The fluid pressure in the fluid conduit 76 is thereby vented through the fixed orifice 70 to the fluid reservoir 28. This opens the bypass valve 40 due to the differential pressure acting thereon.

The fixed orifice 32 creates a pilot fluid pressure signal proportional to the fluid flow rate through the fixed orifice 32. This pilot fluid pressure signal is conducted by fluid conduit 80 to a solenoid operated valve assembly 200. A port of the solenoid actuated valve assembly 200 is connected in fluid communication with the fluid conduit 88.

The solenoid valve 200 is a proportional valve and is controllable by a pulse-width modulated electrical signal. One specific embodiment of the solenoid operated valve assembly 200 is disclosed in U.S. Pat. No. 4,691,797. The description and construction of the solenoid operated valve assembly, as disclosed in U.S. Pat. No. 4,691,797, is fully incorporated herein by reference. The valve 200 is shown in FIG. 1 schematically in its fully open condition allowing fluid flow between the fluid conduits 80 and 88. The valve 200 is controllable to provide a controlled amount of fluid flow from the fluid conduit 88 to the fluid conduit 80. An electronic control unit 252 is electrically connected to a vehicle speed sensor 254 and to a solenoid 256 of the solenoid valve 200. The speed sensor 254 can be one of several known sensors that monitor vehicle speed and generate an electrical signal having a frequency proportional to the vehicle speed. The electronic control unit 252 processes the speed signal from the speed sensor 254 and generates a pulse-width modulated control signal which controls the valve 200 via the solenoid 256.

The conversion of a speed signal into a pulse-width modulated control signal having a duty cycle responsive to the speed signal is old art. Briefly, the electronic control unit 252 can include a microcomputer having a central processing unit ("CPU") and eraseable programmable, read only memory ("EPROM"). The EPROM can include conversion tables for relating vehicle speed to duty cycle of the pulse-width modulated control signal. The electronic control unit 252 determines vehicle speed from the output signal of the speed sensor 254. The microcomputer then retrieves a value for the duty cycle from the conversion table corresponding to the determined vehicle speed. A pulse-width modulated signal generator is controlled by the microcomputer responsive to the retrieved value from the conversion table.

The pulse-width modulated output signal from the electronic control unit 252 has a constant frequency with the width of the ON time varying in response to the sensed vehicle speed. The degree of the open or closed condition of the valve 200 is responsive to the percentage of ON time of the pulse-width modulated output signal.

The fluid conduit 88 is connected in fluid communication with the fluid conduit 66 and the fluid conduit 76 at a junction point designated as A in FIGS. 1 and 2. The fluid pressure in the spring cavity 44 varies as a function of the fluid pressure at junction A. The fluid pressure at junction A varies in response to both steering load and vehicle speed. Thus, the bypass valve assembly 40 responds to variations in steering load and vehicle speed.

At low vehicle speeds, the pulse-width modulated control signal maintains the valve 200 in its smallest effective orifice size. With the valve 200 at its smallest effective orifice size and at engine idle in a nonsteering condition, the fluid pressure at junction A is at a value sufficient to allow the bypass valve 40 to bypass all the fluid flow from the pump 26 directed to the power steering mechanism 12 except for approximately two gallons per minute. As vehicle speed increases and in a nonsteering condition, the effective orifice size of solenoid valve 200 is progressively increased. At a predetermined high vehicle speed, the valve 200 is in a fully open condition. As the valve 200 opens, its effective orifice size increases. When a steering maneuver is initiated and vehicle speed is increasing, the increasing effective orifice size of valve 200 causes the pressure at junction A to reduce, and the bypass valve assembly 40 moves to a more open condition, and more fluid flow from the pump 26 is bypassed. The effect of the valve 200 in combination with the electronic control unit 252 is to provide for a decreasing power assistance with increasing vehicle speed.

At relatively low vehicle speeds and during steering, a relatively large resistance is encountered to turning of the steerable wheels 14, 16. As this occurs, there is a substantial increase in the fluid pressure in both conduit sections 34, 36 of the main conduit 30. The increase in the fluid pressure in the conduit section 34 of the main conduit 30 causes the pilot valve portion 52 to be operated to an open condition. The fluid pressure in the conduit section 34 of the main conduit 30 increases to about 700 psi, depending upon the load encountered by the steerable wheels 14, 16.

When the pilot valve portion 52 is operated to an open condition, the fluid pressure signal in the conduit section 34 is communicated through the pilot valve portion 52 to the fluid conduit 66. This fluid pressure signal modifies the fluid pressure signal in the fluid conduit 88 from the solenoid operated valve assembly 200. Since the solenoid operated valve 200 is controlled in response to vehicle speed, the condition of the solenoid operated valve 200 does not change unless vehicle speed changes. Thus, a change in fluid pressure at junction A without a speed change is the result of the increased fluid pressure in the conduit section 34.

An increased fluid pressure at junction A is communicated through the fluid conduit 76 and the pilot conduit 74 to the spring cavity 44 of the bypass valve 40. This causes the bypass valve 40 to move to a more closed condition. By urging the bypass valve 40 toward a closed condition, the bypass valve 40 moves to reduce the bypassing of fluid. This results in a greater amount of the fluid flow from the pump 26 being available to turn the steerable wheels 14, 16 against the relatively large resistance encountered during turning of the steerable wheels 14, 16 at relatively slow speeds.

It should be clear from the above description that the fluid flow to the steering control valve 18 is controlled in response to the load sensed demand for fluid and in response to at least one vehicle operating parameter, such as vehicle speed. At low vehicle speeds in a nonsteering condition of the vehicle, only a relatively small amount of fluid flow to the steering control valve 18 is maintained. The fluid flow from the pump 26 to the steering control valve 18 is thereby minimized. Fluid flow to the steering control valve 18 at low vehicle speeds in a nonsteering condition results in unnecessary horsepower consumption. Thus, horsepower consumption is minimized by minimizing fluid flow to the steering control valve 18 at low vehicle speeds in a nonsteering condition of the vehicle.

It should be apparent from the above that the applicant has provided a new and improved power steering system and that certain changes and modifications may be made therein by one skilled in the art, and it is intended to cover such changes and modifications coming within the scope of the appended claims.

Having described a specific preferred embodiment of the invention, the following is claimed:

1. An apparatus for use in a power steering system having a hydraulic pump and a power steering motor which is operable to turn steerable vehicle wheels in response to operation of a power steering control valve, said apparatus comprising:
   means for providing a signal indicative of at least one vehicle operating parameter;
   main conduit means for conducting fluid from the pump to the power steering control valve;
   bypass valve means for bypassing fluid from said main conduit means, said bypass valve means being urged toward an open condition;
   first pilot valve means for, when open, communicating fluid pressure in said main conduit means to said bypass valve means to urge said bypass valve means toward a closed condition;
   second pilot valve means responsive to said signal indicative of at least one vehicle operating parameter for, when open, communicating said main conduit means and said bypass valve means; and
   relief valve means connected in fluid communication with said first and second pilot valve means for, when open, venting pressure to prevent the occurrence of an excessive fluid pressure condition.

2. An apparatus as set forth in claim 1 further including pilot conduit means communicating the fluid pressure in said main conduit means to urge said bypass valve means toward the open condition.

3. An apparatus as set forth in claim 1 wherein said first pilot valve means includes a valve member having a surface area exposed to the fluid pressure in said main conduit means and a spring biasing said valve member against the fluid pressure in said main conduit means, said valve member moving to an open position in response to the fluid pressure in said main conduit means exceeding a predetermined fluid pressure.

4. An apparatus as set forth in claim 1 wherein said first pilot valve means includes pressure relief valve means for venting the fluid pressure urging said bypass valve means toward a closed condition when the fluid pressure urging said bypass valve means toward a closed condition exceeds a predetermined fluid pressure.

5. An apparatus as set forth in claim 1 wherein said first pilot valve means includes a valve member having a surface area exposed to the fluid pressure in said main conduit means and a spring biasing said valve member against the fluid pressure in said main conduit means, said valve member moving to an open position in response to the fluid pressure in said main conduit means exceeding a first predetermined fluid pressure, said first pilot valve means further including pressure relief valve means for venting the fluid pressure urging said bypass valve means toward a closed condition when the fluid pressure urging said bypass valve means toward a closed condition exceeds a second predetermined fluid pressure.

6. An apparatus as set forth in claim 1 wherein said second pilot valve means includes an actuatable solenoid valve for, when actuated, communicating fluid pressure in said bypass valve means to said main conduit means to enable said bypass valve means to move toward an open condition, and means for actuating said solenoid valve in response to changes in vehicle speed.

7. An apparatus for controlling fluid flow from a hydraulic pump to a hydraulic power steering mechanism, said apparatus comprising:
   means for providing a signal indicative of at least one vehicle operating parameter;
   orifice means, through which fluid from the pump flows to the power steering mechanism, for generating a first fluid pressure signal proportional to the fluid flow rate through said orifice means;
   first valve means for modifying said first fluid pressure signal to provide a second fluid pressure signal in response to said signal indicative of at least one vehicle operating parameter;
   second valve means for modifying said second fluid pressure signal including pressure responsive pilot valve means; and
   bypass valve means for bypassing fluid flow away from the steering mechanism in response in part to said modified second fluid pressure signal.

8. An apparatus as set forth in claim 7 wherein said pressure responsive pilot valve means is operable to vary said second fluid pressure signal as a function of variations in the fluid pressure between the pump and said orifice means.

9. An apparatus as set forth in claim 8 wherein said second valve means further includes relief valve means for venting said pressure responsive pilot valve means when the fluid pressure in said pressure responsive pilot valve means exceeds a predetermined fluid pressure.

10. An apparatus as set forth in claim 7 wherein said first valve means includes a solenoid valve, and further including means for actuating said solenoid valve in response to changes in vehicle speed.

11. An apparatus for controlling fluid flow from a hydraulic pump to a hydraulic power steering mechanism, said apparatus comprising:
   means for providing a signal indicative of vehicle speed;
   main conduit means for conducting fluid from the pump to the steering mechanism;
   bypass valve means for, when open, bypassing fluid from said main conduit means;
   first valve means for providing a first fluid pressure signal to urge said bypass valve means toward a closed condition as vehicle speed decreases, said first fluid pressure signal being generated in response to said signal indicative of vehicle speed;
   second valve means for providing a second fluid pressure signal to urge said bypass valve means toward a closed condition, said second fluid pressure signal being provided in response to fluid pressure variations in said main conduit means; and
   relief valve means connected in fluid communication with said first and second valve means for, when open, venting the fluid pressure urging said bypass valve means toward a closed condition when the fluid pressure urging said bypass valve means toward a closed condition exceeds a predetermined fluid pressure.

12. An apparatus as set forth in claim 11 wherein said first valve means includes electrically controlled solenoid valve pilot means operable from a closed condition toward an open condition in response to increasing vehicle speed.

13. An apparatus as set forth in claim 11 wherein said second valve means includes a pressure responsive pilot valve means connected in fluid communication with said main conduit means and operable from a closed condition toward a fully open condition under the influence of increasing fluid pressure conducted from said main conduit means.

* * * * *